United States Patent [19]

Glover

[11] Patent Number: 4,806,901
[45] Date of Patent: Feb. 21, 1989

[54] MOTION TRANSDUCER
[75] Inventor: Alfred H. Glover, Decatur, Ala.
[73] Assignee: Chrysler Motors Corporation, Highland Park, Mich.
[21] Appl. No.: 898,669
[22] Filed: Aug. 21, 1986
[51] Int. Cl.⁴ ............................................. H01C 10/10
[52] U.S. Cl. ..................................... 338/42; 338/150; 74/99 R
[58] Field of Search ..................... 338/42, 145, 4, 150, 338/41, 39; 73/301, 725, 729; 340/870.01; 74/99 R

[56] References Cited

U.S. PATENT DOCUMENTS

| | | | |
|---|---|---|---|
| 2,027,386 | 1/1936 | Krümmer | 74/99 |
| 2,286,717 | 6/1942 | Clason | 338/42 |
| 2,525,095 | 10/1950 | Coxon et al. | 338/42 |
| 2,943,302 | 6/1960 | Clason | 73/301 X |
| 3,160,014 | 12/1964 | De Julio et al. | 73/725 |
| 4,064,476 | 12/1977 | Reis | 338/41 |
| 4,086,557 | 4/1978 | Padgitt et al. | 338/42 |
| 4,449,113 | 5/1984 | Gould et al. | 338/39 |
| 4,548,091 | 10/1985 | Norton | 74/99 |

Primary Examiner—E. A. Goldberg
Assistant Examiner—M. M. Lateef
Attorney, Agent, or Firm—Kenneth H. MacLean, Jr.

[57] ABSTRACT

A device for transmitting linear motion into rotary motion, particularly as applied to an oil pressure transducer for a vehicle I.C.E. Specifically, the linear movement is produced by action of pressure against a diaphragm as opposed by a yieldable spring. The spring is a wire curved into a helix shape and with the ends attached to a rotary table. The midportion of the spring is operably attached to the central portion of the diaphragm so that linear movement thereof toward the rotary table causes the spring's end portions to progressively engage the table in overlying relation and, accordingly, to produce rotation of the table.

4 Claims, 1 Drawing Sheet

MOTION TRANSDUCER

BACKGROUND OF THE INVENTION

It has long been desired to produce a simple device which transmits linear motion of one member directly into rotary motion of another member. This is particularly desirable in an oil pressure transducer as used in vehicles with internal combustion engines. The object of a device of this kind is to accurately transmit the pressure level of oil in the engine with a device of simple construction with few parts and great reliability.

An early pressure indicator is disclosed in U.S. Pat. No. 1,171,480 to Troll. In the Troll patent, a linear moving member attached to a diaphragm transmits the linear movement to rotary movement by means of a lever and gear arrangement. The mechanism is relatively complex as opposed to the subject device to be described hereinafter.

Another relatively early device is shown in U.S. Pat. No. 2,877,327 to Hastings. The Hastings device utilizes a movable diaphragm member responsive to liquid pressure. The diaphragm member includes a linearly movable portion with an axial aperture therethrough. A pin with a spiral channel formed therein moves in the aperture and is rotated by means of a follower which extends into the channel. While producing rotary movement directly from linear movement, the Hastings patent provides an entirely different structure than the subject device.

Other patents known to applicant are as follows: U.S. Pat. Nos. 4,086,557; 2,943,302; 2,286,717; 4,449,113; 3,160,014; and 2,525,095. None of the aforementioned pressure indicators of transducers utilize the structure of the subject device to be described hereinafter.

SUMMARY OF THE INVENTION

The subject pressure transducer includes a mechanism for directly transmitting linear motion of one another into rotary motion of another member. Specifically, force is produced on a diaphragm exposed to oil pressure of an engine which causes the midportion of the diaphragm to move away from the oil. A member adjacent the diaphragm moves therewith in a linear motion. A table member is supported in a housing of the transducer and is capable only of rotary motion and has a resistor grid thereon adapted to be engaged by contacts as the table rotates. The transmission of linear to rotary motion is through a helical spring with two end portions attached to the underside of the rotary table and with the end portions extending generally in a circumferential direction near the periphery thereof. The midportion of the spring extends toward the diaphragm and is engaged by the diaphragm associated member. This member is prohibited from rotation and moves linearly in the direction towards the rotary table with pressure increases. The resultant force on the helical spring causes the end portions to progressively overlay greater circumferential portions of the rotary table while simultaneously producing rotary movement of the table.

From the foregoing, it can be readily understood that the subject device is a relatively simple and reliable means to transmit linear movement into rotary movement. Further advantages can be appreciated by a reading of the following detailed description of a preferred embodiment shown in the drawings as follows.

IN THE DRAWINGS

DETAILED DESCRIPTION OF AN EMBODIMENT

Figure 1:
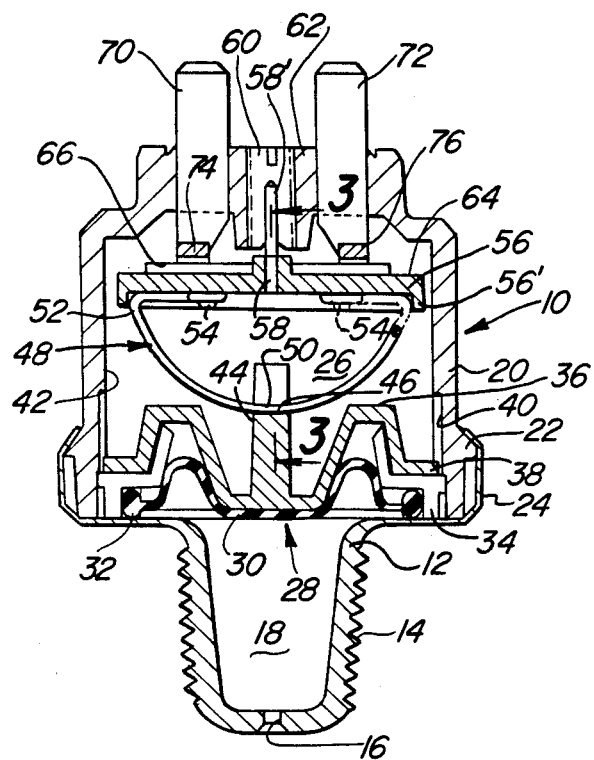
FIG. 1 is an elevational and sectioned view of the subject pressure transducer.

In FIG. 1, an oil pressure transducer 10 is shown. The transducer 10 includes a hollow lower base or mounting member 12 with a cylindrical threaded portion 14 adapted to threadably engage a similarly threaded aperture in the engine which communicates with the engine lubrication system. Specifically, an opening 16 in the end of the base member 12 permits pressurized lubricant from the engine lubrication system to enter the hollow interior 18 of member 12.

The base member 12 supports a hollow upper body portion 20 with a lower edge portion 22 engaging member 12. Specifically, the upper housing portion 20 is joined to the lower portion 12 by rolling over an edge portion 24 of the member 12 around the edge portion 22 of member 20. Also, supported between the two housings 121 and 20 is a diaphragm assembly 28 including a flexible diaphragm member 30. The outer peripheral edge 32 of the diaphragm member 30 is secured against the housing 12 by means of an annular support member 34. This leaves the midportion of the diaphragm 30 free to move in response to pressure differentials between atmosphere and the pressurized lubricant within the interior 18 of housing 12. The midportion of the diaphragm 30 is engaged by a movable plate or back-up member 36 which is adapted to move with the midportion of diaphragm 30 in response to changes in lubrication pressure. The outer edge portion 38 of the back-up plate 36 is configured to move within channels 40 in housing 20. The channels 40 which extend in an axial direction are formed in the interior wall 42 of member 20 to permit the back-up member 36 to move only axially within housing 20.

Figure 2:
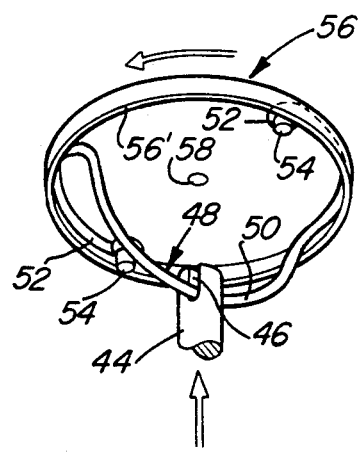
FIG. 2 is a perspective partial view of the movement transmitting portions of the transducer shown in FIG. 1.
Figure 3:
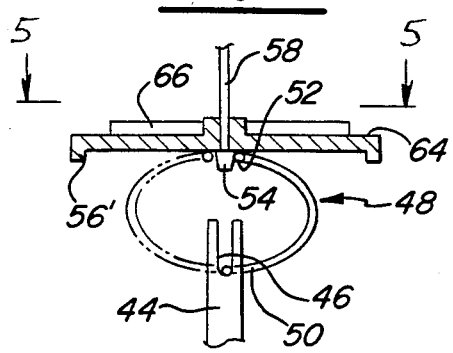
FIG. 3 is a partial elevational and sectioned view of the motion transmitting portions of the housing shown in FIG. 1 and taken along section line 3—3 therein.

The back-up plate assembly 36 includes a central boss or upstanding portion 44 which has a slot 46 formed therein as best shown in FIGS. 2 and 3. The slot 46 receives the midportion 50 os a torsion spring 48. Specifically, the configuration of the torsion spring 48 is in the form of a helix with end portions 52 circumferentially overlying a rotatable table 56. Specifically, the extreme end portions 52 are formed with circular portions to supportingly engage small posts 54 depending from the underside of the rotatable table 56. The posts 54 and end portions 52 secure the spring 48 to the bottom of the rotatable table 56 as best shown in FIG. 2. Referring specifically to FIGS. 1 and 2, it can be seen that the end portions 52 of the spring 48 overlie the circumferential or peripheral edge portions 56' of the rotatable table 56. The peripheral edge portion 56' is formed into a lip extending downward from the main body portion of the rotatable table and, thus, acts as a fence or a guide for the end portions 52 of the spring.

Movement of the member 36 and post 44 toward the rotatable table causes the end portions 52 to progressively increase their overlying relationship with the peripheral edge portion 56' of the rotatable table 56. Resultantly, the rotatable table 56 is rotated within the housing 20.

The rotatable table 56 is supported within the housing 20 by means of a pin or shaft 58. Shaft 58 is press fit within the central opening of the rotatable table 56 and an upwardly projecting portion 58' which extends into a threaded adjustable shaft support member 60. Specifically, the shaft support member 60 is threadably secured in the upper end 62 of the housing member 20. This arrangement permits the rotatable table 56 to rotate within the housing 20 and permits the table to be moved in an axial direction with respect to the diaphragm assembly 28 during calibration.

Figure 5:
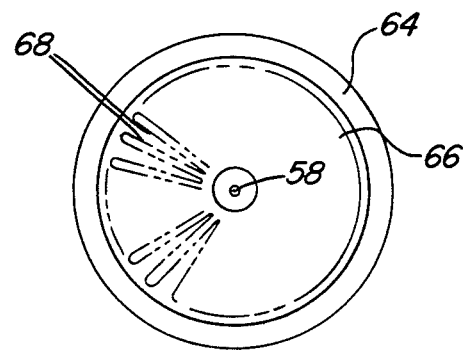
FIG. 5 is a view of the rotary portion of the transducer taken along view line 5—5 in FIG. 3.
Figure 4:
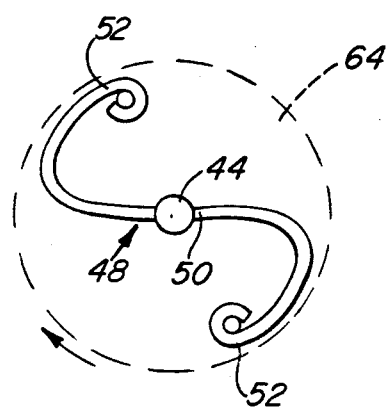
FIG. 4 is a view of the underside of the rotary portion of the transducer taken in the direction of the arrow in FIG. 2.

The rotatable table 56 has an upper flat surface 64 about the shaft 58. A circular resistor card 66 is adhesively mounted on the surface 64. The card 66 is of plastic material and has an electrical resistor grid or pattern 68 formed thereon in the pattern shown in FIG. 5. The resistor card 66 and the grid 68 thereon are adapted to be contacted by two terminal posts 70 and 72 which are securely attached by molding in situ within the housing member 20. The terminals 70 and 72 support contact pads 74 and 76 on their lower ends which are adapted to engage the grid of conductive material 68 of the resistor card 66.

It now can be readily understood how the pressure transducer shown in FIGS. 1-5 operates. Specifically, lubricant pressure within interior 18 of housing 12 creates a pressure differential on the diaphragm assembly 28 which will tend to move the back-up plate member 36 upward in FIG. 1 toward the rotatable table 56. It should be remembered that the back-up plate 36 can only move in the axial direction and cannot rotate. The force of the diaphragm assembly 28 is exerted on the central portions 50 of the torsion spring 48. This causes the end portions 52 thereof to progressively overlay the bottom surface and peripheral edge of the rotatable table and, specifically, along the fence or edge portion 56' thereof. As the end portions 52 overlie progressively more of the rotatable table 56, the table is rotated as best shown in FIG. 2. The rotation of the table and the attached resistor card 66 causes the resistor grid or pattern 68 thereon to move across the contact pads 74 and 76 of the terminal post 70 and 72 in a manner changing the resistance output of the pressure transducer as exhibited across the terminal posts 70 and 72.

Accordingly, the aforesaid description is of a pressure transducer with means to directly transmit the linear motion of a diaphragm assembly into rotary motion of a resistor table by means of a helix shaped torsion spring. Although only one embodiment of this device has been illustrated and described in great detail, it can be readily understood that other embodiments of the device will be contemplated and still fall within the scope of the invention as described in the following claims.

I claim:

1. A fluid pressure transducer device with means for transmitting linear motion into rotary motion and finally for generating a corresponding electrical output proportional to the motion transmittal, comprising:

the pressure transducer including a hollow first housing member with aperture means for receiving pressurized fluid within its interior;

a second hollow housing member attached to the first housing member.

a flexible diaphragm assembly extending between the first and second housing members and with a midpoint thereof movable in the axial direction of the housing members in response to pressure differentials, one surface of the movable diaphragm member being exposed to pressurized fluid within the first housing member;

a diaphragm back-up member responsive to movements of the midportion of the diaphragm and supported within the second housing member in a manner permitting only rotary motion and no substantial axial motion thereof;

a rotary table member supported within the second housing member in a manner permitting only rotary motion and no substantial axial motion thereof, the rotary table member having an underside facing the back-up member and with a circumferential peripheral edge thereabout;

spring means between the axially moving back-up member and the rotary moving table member, the spring means having opposite end portions overlying a peripheral edge of the rotary table member and attached thereto at the extreme end portions;

the spring having a curved midportion engaged by the linearly movable back-up member whereby axial movements of the back-up member toward the rotatable table forces the end portions of the spring to progressively overlie greater peripheral edge portions of the rotary table causing the rotary table to rotate in response thereto;

the rotary table member having an overside opposite the underside;

an electrical resistance grid supported on the overside of the rotary table;

electrical contact means supported by the second housing member adjacent to the resistance grid and adapted to slidingly engage portions of the resistance grid as the rotary table moves with respect to the second housing member.

2. A fluid pressure transducer with means for transmitting linear motion into rotary motion, comprising:

a first hollow housing member with aperture means for receiving pressurized fluid within its interior;

a second hollow housing member attached to the first member;

flexible diaphragm means with its peripheral edge secured between the two housing members and with a midportion exposed to the pressurized fluid on one side to produce movements thereof with increased fluid pressure;

a diaphragm back-up member responsive to movements of the diaphragm and cooperative with the second housing member to limit movements thereof to linear travel generally normal to the plane of the diaphragm;

a rotary table member supported within the second housing in a manner permitting only rotary movements, the table member having an underside facing the diaphragm and back-up members;

a spring extending between the back-up member and the underside of the rotary member, the spring having a curved midportion bowed toward the back-up member and engaged thereby;

opposite end portions of the spring curved from the midportion helically with portions curved in one circumferential direction of the table member, the extreme ends being attached to the underside of the table member, whereby linear movement of the back-up member and spring midportion towards and away from the table member cause the spring's end portions to progressively overlie the peripheral edge of the table member's underside to a greater or lesser extent, respectively, accompanied by resultant rotation of the table member.

3. The transducer of claim 2 including a normally extending peripheral lip means depending from the underside of the table member to guide the overlying of the spring's end portions.

4. The transducer of claim 2 including means to generate an electrical output signal in response to movements of the rotary table, the means including an electrical resistance grid supported by the rotary table;

electrical contact means supported by the second housing member adjacent to the resistance grid and adapted to slidingly engage portions of the resistance grid as the rotary table moves with respect to the second housing member.

* * * * *